United States Patent
Lind et al.

(10) Patent No.: US 10,169,511 B2
(45) Date of Patent: Jan. 1, 2019

(54) METHOD TO SYNTHESIZE A CROSS BAR SWITCH IN A HIGHLY CONGESTED ENVIRONMENT

(71) Applicant: INTERNATIONAL BUSINESS MACHINES CORPORATION, Armonk, NY (US)

(72) Inventors: Kurt Lind, Tuebingen (DE); Friedrich Schroeder, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/472,441

(22) Filed: Mar. 29, 2017

(65) Prior Publication Data

US 2018/0285486 A1    Oct. 4, 2018

(51) Int. Cl.
*G06F 17/50*    (2006.01)

(52) U.S. Cl.
CPC ........ *G06F 17/505* (2013.01); *G06F 17/5072* (2013.01); *G06F 17/5081* (2013.01); *G06F 2217/06* (2013.01)

(58) Field of Classification Search
CPC ............... G06F 17/505; G06F 17/5081; G06F 17/5072; G06F 2217/06
See application file for complete search history.

(56) References Cited

U.S. PATENT DOCUMENTS

| | | | |
|---|---|---|---|
| 5,452,231 A | 9/1995 | Butts et al. | |
| 6,018,523 A * | 1/2000 | Even | H04L 49/106 340/2.28 |
| 6,185,220 B1 * | 2/2001 | Muthukrishnan | H04L 12/5601 370/389 |
| 6,289,494 B1 * | 9/2001 | Sample | G06F 15/7867 716/104 |
| 6,557,070 B1 * | 4/2003 | Noel, Jr. | G06F 13/4022 370/412 |
| 6,710,623 B1 | 3/2004 | Jones et al. | |

(Continued)

OTHER PUBLICATIONS

"A 128x128x24Gb/s Crossbar Interconnecting 128 tiles in a single hop and Occupying 6% of their area", by Girogos Passas, Manolis Katevenis, and Dionisis Pnevmatikatos, Inst of Computer Sicence (ICS), IEEE, May 2010.*

(Continued)

*Primary Examiner* — Nha T Nguyen
(74) *Attorney, Agent, or Firm* — Margaret McNamara, Esq.; Kevin P. Radigan, Esq.; Heslin Rothenberg Farley & Mesiti P.C.

(57) ABSTRACT

A facility is provided for automatically generating design data for a semiconductor circuit including a crossbar switch. The method includes synthesizing the crossbar switch using predefined multiplexer building blocks, where the predefined multiplexer building blocks include at least a multiplexer, an input driver and a select driver. In addition, the method includes regularly placing the predefined multiplexer building blocks to define a crossbar switch arrangement, testing the crossbar switch arrangement for timing constraints and re-synthesizing the crossbar switch and/or replacing the predefined multiplexer building blocks based on the testing.

11 Claims, 11 Drawing Sheets

(56) References Cited

U.S. PATENT DOCUMENTS

| | | | |
|---|---|---|---|
| 7,139,292 B1* | 11/2006 | Evans | H03K 19/1737 370/539 |
| 7,149,996 B1* | 12/2006 | Lysaght | H04Q 3/54533 326/38 |
| 7,925,816 B2* | 4/2011 | Olesinski | G06F 13/4022 710/310 |
| 8,082,526 B2 | 12/2011 | Hutton et al. | |
| 8,098,081 B1 | 1/2012 | Trimberger | |
| 8,493,090 B1 | 7/2013 | Trimberger | |
| 8,583,850 B2 | 11/2013 | Masleid et al. | |
| 8,704,408 B2* | 4/2014 | Becker | G01R 31/2844 307/113 |
| 8,898,611 B2* | 11/2014 | Konda | G06F 17/509 716/121 |
| 9,077,338 B1 | 7/2015 | Schulz et al. | |
| 9,157,952 B2* | 10/2015 | Becker | G01R 31/2844 |
| 9,183,344 B2 | 11/2015 | Teig et al. | |
| 9,203,739 B2 | 12/2015 | Beecroft | |
| 9,817,933 B2* | 11/2017 | Wang | G06F 17/5054 |
| 9,906,225 B2* | 2/2018 | Wang | H03K 19/17724 |
| 9,929,979 B2* | 3/2018 | St. Germain | H04L 49/40 |
| 2003/0077025 A1* | 4/2003 | Zhang | G02B 6/124 385/17 |
| 2003/0233508 A1* | 12/2003 | Bosshart | H04Q 3/521 710/316 |
| 2005/0206536 A1* | 9/2005 | Holberg | H03K 19/1731 341/50 |
| 2007/0076824 A1* | 4/2007 | Graef | H03M 13/395 375/341 |
| 2008/0143379 A1* | 6/2008 | Norman | H01L 23/50 326/39 |
| 2008/0285449 A1* | 11/2008 | Larsson | H04L 49/1515 370/232 |
| 2010/0058261 A1* | 3/2010 | Markov | G06F 17/5045 716/106 |
| 2011/0090905 A1* | 4/2011 | Mueller | H04L 49/1515 370/360 |
| 2012/0047310 A1* | 2/2012 | Satpathy | G11C 7/10 710/317 |
| 2012/0262009 A1* | 10/2012 | Becker | G01R 31/2844 307/113 |
| 2013/0086537 A1* | 4/2013 | Alpert | G06F 17/505 716/103 |
| 2013/0311697 A1* | 11/2013 | Abel | G06F 15/17375 710/317 |
| 2014/0156929 A1 | 6/2014 | Falsafi et al. | |
| 2014/0198631 A1* | 7/2014 | Cavanna | H04L 41/0806 370/218 |
| 2014/0247825 A1* | 9/2014 | Rao | H04Q 11/00 370/359 |
| 2014/0376557 A1* | 12/2014 | Park | G06F 15/17381 370/400 |
| 2015/0046895 A1* | 2/2015 | Konda | G06F 17/5077 716/128 |
| 2015/0063348 A1 | 3/2015 | Chrysos et al. | |
| 2015/0146569 A1* | 5/2015 | Rauh | H04L 49/1515 370/254 |
| 2015/0244647 A1* | 8/2015 | Gopalan | H04L 49/15 370/386 |
| 2016/0380629 A1* | 12/2016 | Chen | H03K 19/0008 326/38 |
| 2017/0063625 A1* | 3/2017 | Philip | H04L 41/0889 |
| 2017/0180510 A1* | 6/2017 | Mau | H04L 67/34 |
| 2017/0206959 A1* | 7/2017 | Jeon | G11C 13/0028 |
| 2017/0256587 A1* | 9/2017 | Tsuji | H01L 27/2463 |
| 2017/0289063 A1* | 10/2017 | Adler | H04L 49/101 |
| 2018/0095930 A1* | 4/2018 | Lu | G06F 15/7867 |

OTHER PUBLICATIONS

Hoo, et al., "An Area-Efficient Partially Reconfigurable Crossbar Switch with Low Reconfiguration Delay", 2012 22nd International Conference on Field Programmable Logic and Applications (FPL), Aug. 29-31, 2012 (7 pages).

Tsai et al, "Routability Optimization for Crossbar-Switch Structured ASIC Design", ACM Transactions on Design Automation of Electronic Systems, vol. 18, No. 3, Article 39, Pub date: Jul. 2013 (28 pages).

Lee, et al., "A 256-Radix Crossbar Switch Using Mux-Matrix-Mux Folded-Clos Topology", Journal of Semiconductor Technology and Science, vol. 14, No. 6, Dec. 2014 (8 pages).

Sahin, Devrim, "A Locality Preserving One-Sided Binary Tree-Crossbar Switch Wiring Design Algorithm", 2015 49th Annual Conference on Information Sciences and Systems (CISS), Mar. 18-20, 2015, (4 pages).

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA™ Version 2.07B," International Business Machines Corporation, Apr. 9, 2015, pp. 1-1527.

Barowski et al., "Cross Bar Switch Structure for Highly Congested Environments", U.S. Appl. No. 15/472,460, filed Mar. 29, 2017 (32 pages).

Lind et al., "List of IBM Patents and/or Patent Applications Treated as Related", U.S. Appl. No. 15/472,441, filed Mar. 29, 2017, dated Mar. 29, 2017 (2 pages).

Wu et al., "A 2Gb/s 256*256 CMOS Crossbar Switch Fabric Core Design Using Pipelines MUX", IEEE Transactions, pp. 568-571 (2002).

* cited by examiner

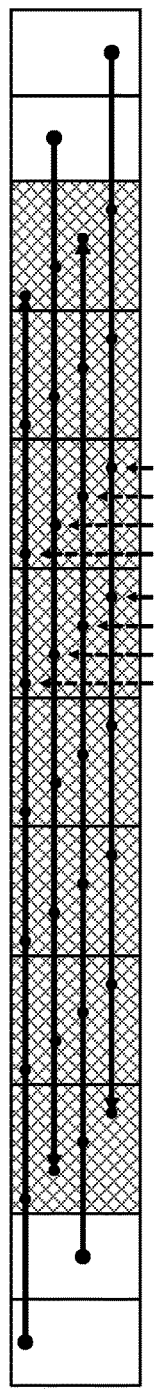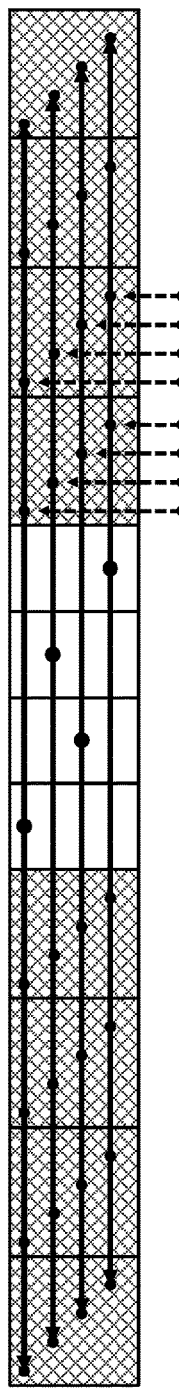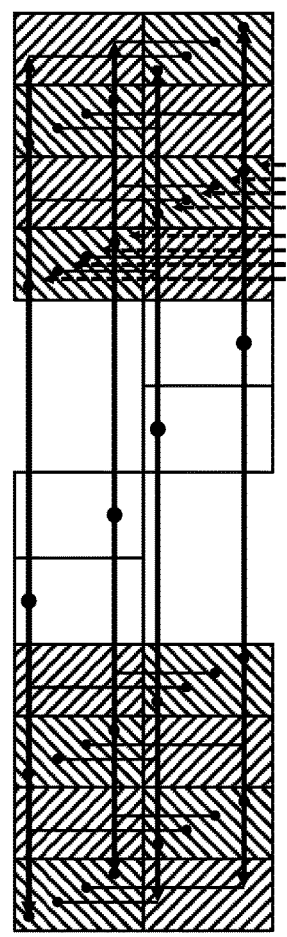
Fig. 7a
Fig. 7b
Fig. 7c

METHOD TO SYNTHESIZE A CROSS BAR SWITCH IN A HIGHLY CONGESTED ENVIRONMENT

BACKGROUND

The disclosure relates to a semiconductor circuit which includes a crossbar switch arrangement, and to a method for generating a semiconductor design of a crossbar switch arrangement.

With each new technology generation, building crossbar switch arrangements becomes more difficult. As transfer and structure sizes shrink, the wire quality decreases. Thus, known synthesis tools may have difficulties to provide a proper design for routing and complying with timing requirements.

SUMMARY

Shortcomings of the prior art are overcome and additional advantages are provided through the provision of a method for automatically generating design data for a semiconductor circuit which includes a crossbar switch. The method includes synthesizing the crossbar switch using predefined multiplexer building blocks, where the predefined multiplexer building blocks include at least a multiplexer, an input driver and the select driver. Further, the method includes regularly placing the predefined multiplexer building blocks to define a crossbar switch arrangement, testing the crossbar switch arrangement for timing constraints, and re-synthesizing the crossbar switch and/or replacing the predefined multiplexer building blocks based on the testing.

Computer program products and systems relating to one or more aspects are also described and claimed herein.

Additional features and advantages are realized through the techniques disclosed herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent through the following detailed description taken in conjunction with the accompanying drawings in which:

FIGS. 7a-7c illustrate for comparison three exemplary crossbar switch arrangements, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well known materials, systems, devices, processing techniques, etc. are omitted so as not to unnecessarily obscure the invention of detail. It should be understood, however, that the detail description and the specific example(s), while indicating aspects of the invention, are given by way of illustration only, and are not be way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, for automated generating of design data for a semiconductor circuit which includes a crossbar switch.

Figure 1:
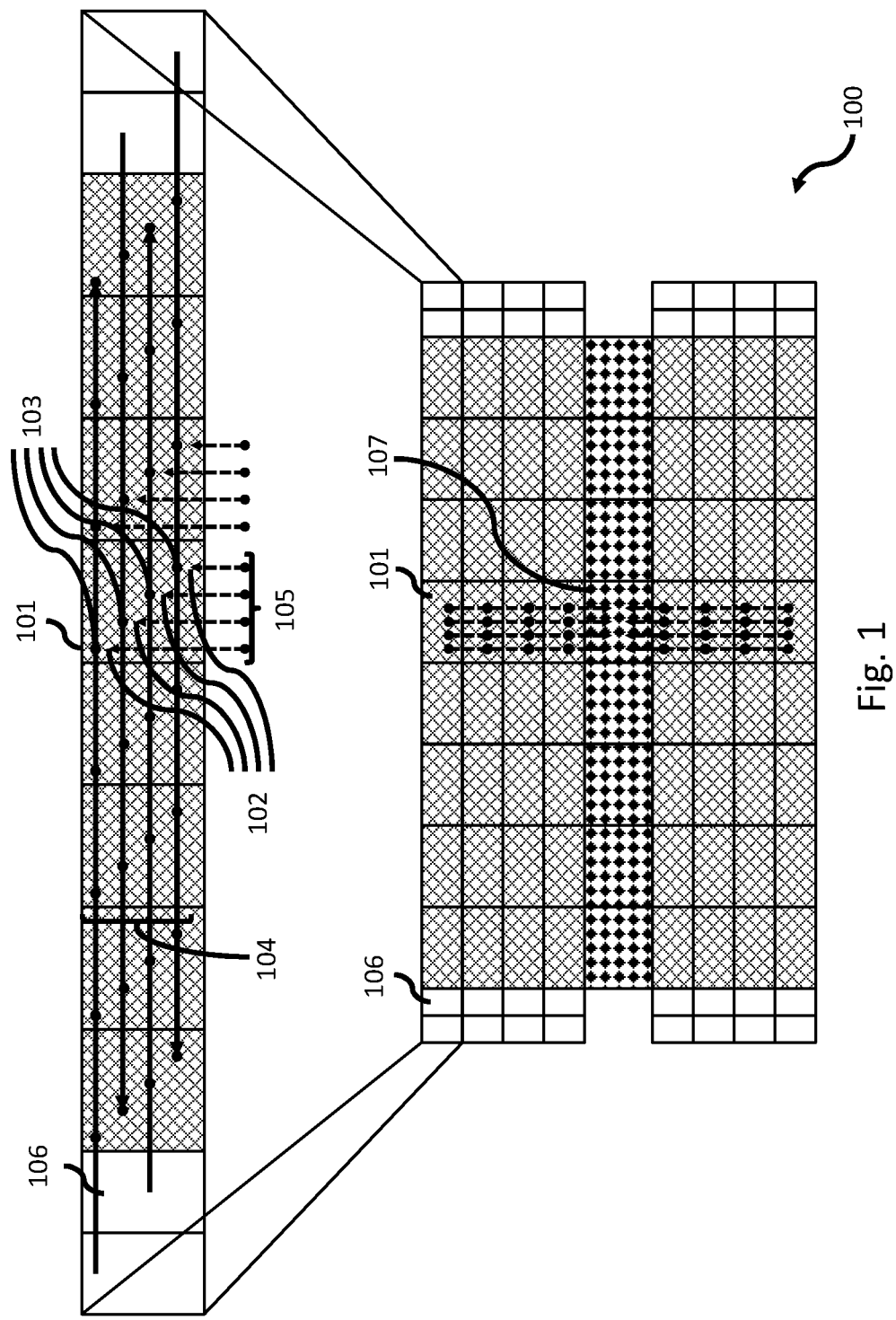
FIG. 1 shows an exemplary crossbar switch arrangement, in accordance with one or more aspects of the present invention.

FIG. 1 shows a first exemplary crossbar switch arrangement 100 of a semiconductor circuit. The crossbar switch arrangement 100 includes multiple multiplexers 101 shown with a crosshatched pattern. The multiplexers each include a multiplexing circuit having a number of data inputs 103, which may be called depth of the multiplexing circuit, and one output as well as a primary output driver. The outputs of the multiplexing circuits correspond to the outputs of the crossbar switch arrangement 101.

Furthermore, the multiplexing circuit includes a number of select inputs 102 for selecting which data input 103 is to be connected to the output of the multiplexing circuit 101. The number of select inputs 102 corresponds to the number of data inputs 103.

A set of input lines 104 is connected to the data inputs 103 of the multiplexing circuits, which extend along a first direction of the semiconductor circuit 100, e.g. horizontally, as shown in FIG. 1. The first input line may be connected to the first data inputs of the multiplexing circuits, the second input line may be connected to the second inputs of the multiplexing circuits, etc.

Moreover, a set of select lines 105 are provided extending along a second direction of the semiconductor circuit 100, e.g., vertically as shown in FIG. 1. The first select line may be connected to the first select inputs of multiplexing circuits in a column, the second select line may be connected to the second select inputs of the multiplexing circuits in a column etc.

Input drivers 106 for driving the input data via the input lines 104 to the multiplexers 101 are provided at the edge of each row. Thus, it is convenient to access the input drivers 106 and provide the data signals to the crossbar switch arrangement.

Moreover, arranging the multiplexers in column and rows allows for a well structured wiring of the timing critical input and select lines. The crossbar switch arrangement 100 further includes select drivers 107 provided in the center of two groups of multiplexer rows. Providing the select drivers 107 in the center allows for keeping the select lines 105 shorter and reducing the risk of timing problems.

Each of the multiplexer rows may correspond to a bit bay area, wherein each bit bay area includes two power supply rails.

Figure 2:
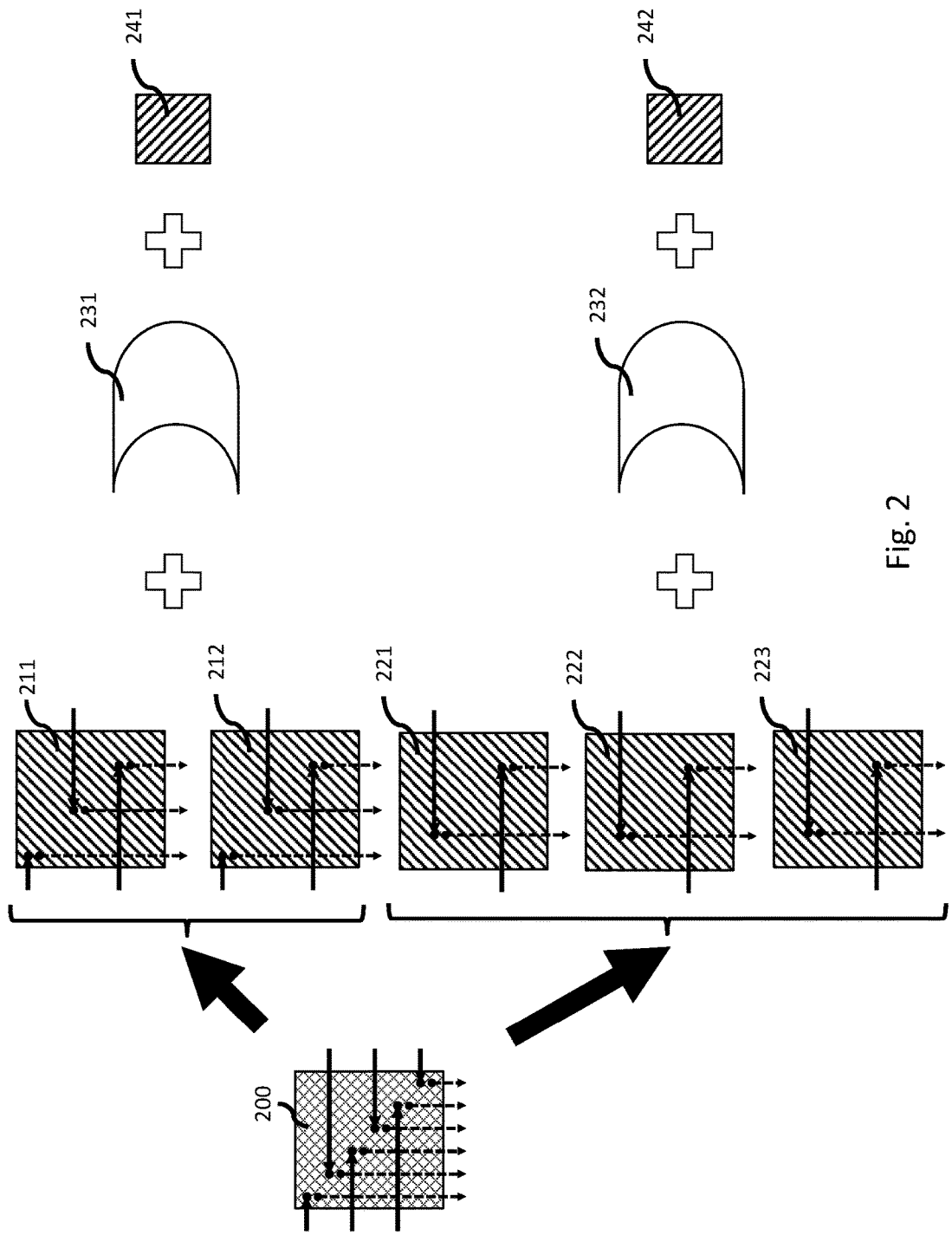
FIG. 2 illustrates one embodiment of splitting multiplexers, in accordance with one or more aspects of the present invention.
Figure 3:
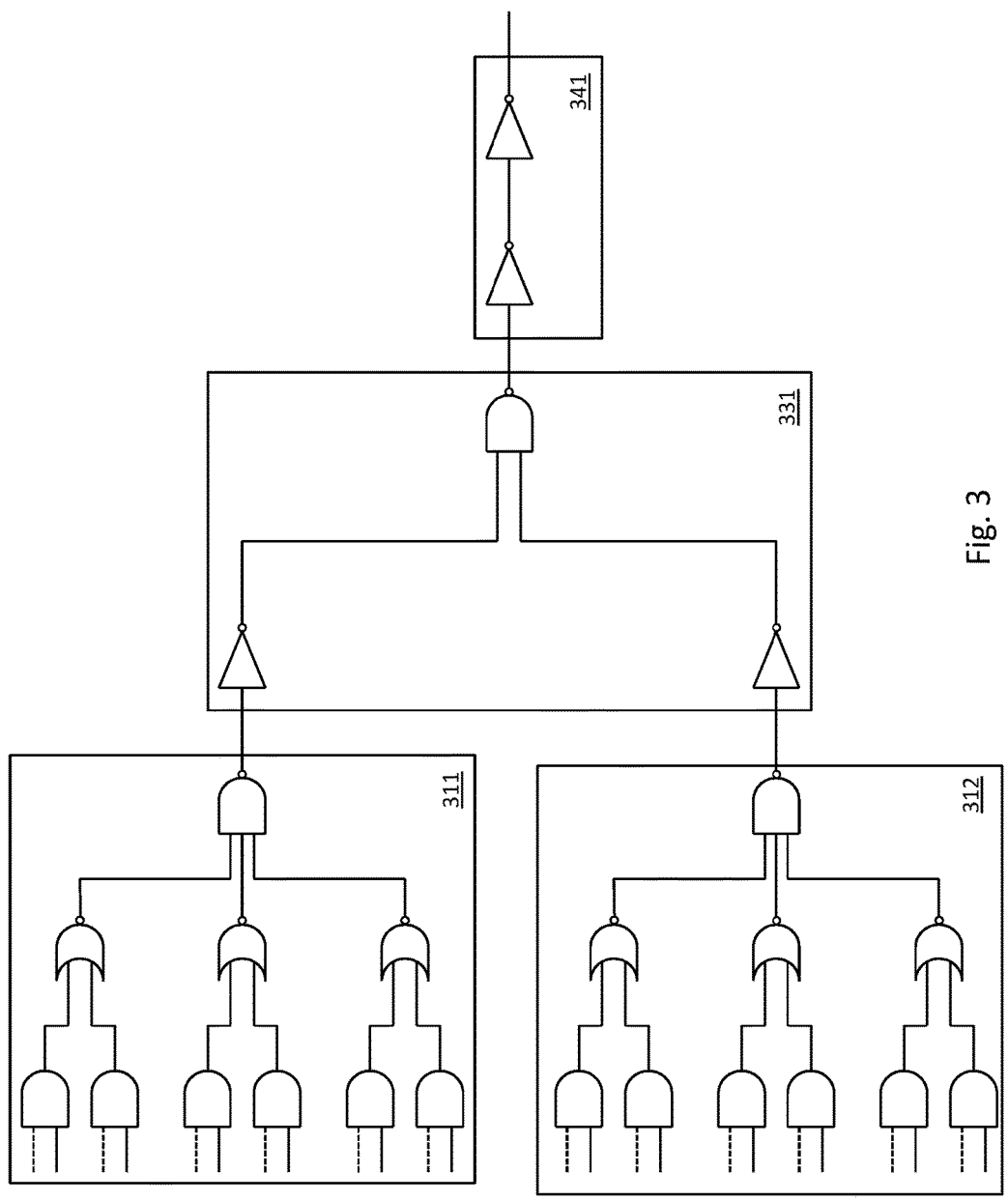
FIG. 3 illustrates another embodiment of splitting multiplexers, in accordance with one or more aspects of the present invention.

FIGS. 2 and 3 show examples for substituting one larger multiplexer 200 with two smaller multiplexers 211, 212; 311, 312 or three smaller multiplexers 221, 222, 223.

For example, the multiplexer 200 may include a multiplexing circuit having six data inputs and six select inputs as well as a primary output driver. This multiplexer 200 may be substituted with two multiplexing circuits 211, 212 each having three data inputs and three select inputs, an OR-circuit 231 for combining the outputs of the two multiplexing circuits 211, 212 as well as a primary output driver 241. The multiplexing circuits 211, 212 are indicated with a hatched pattern from lower left to upper right. The primary output driver 241 is indicated with a hatched pattern from upper left to lower right. A multiplexer, e.g. the multiplexer 200, including a multiplexing circuit and a primary output driver is correspondingly indicated with a crosshatched pattern.

In another example, the multiplexer 200 may be substituted with three multiplexing circuits 221, 222, 223 each having two data inputs and two data inputs, an OR-circuit 232 for combining the outputs of the three multiplexing circuits 221, 222, 223 as well as a primary output driver 242.

FIG. 3 shows in a little bit more detail two multiplexing circuits 311, 312 each including six data inputs (continues lines) and six select inputs (dotted lines), an OR-circuit 331 as well as a primary output driver 341.

Figure 4:
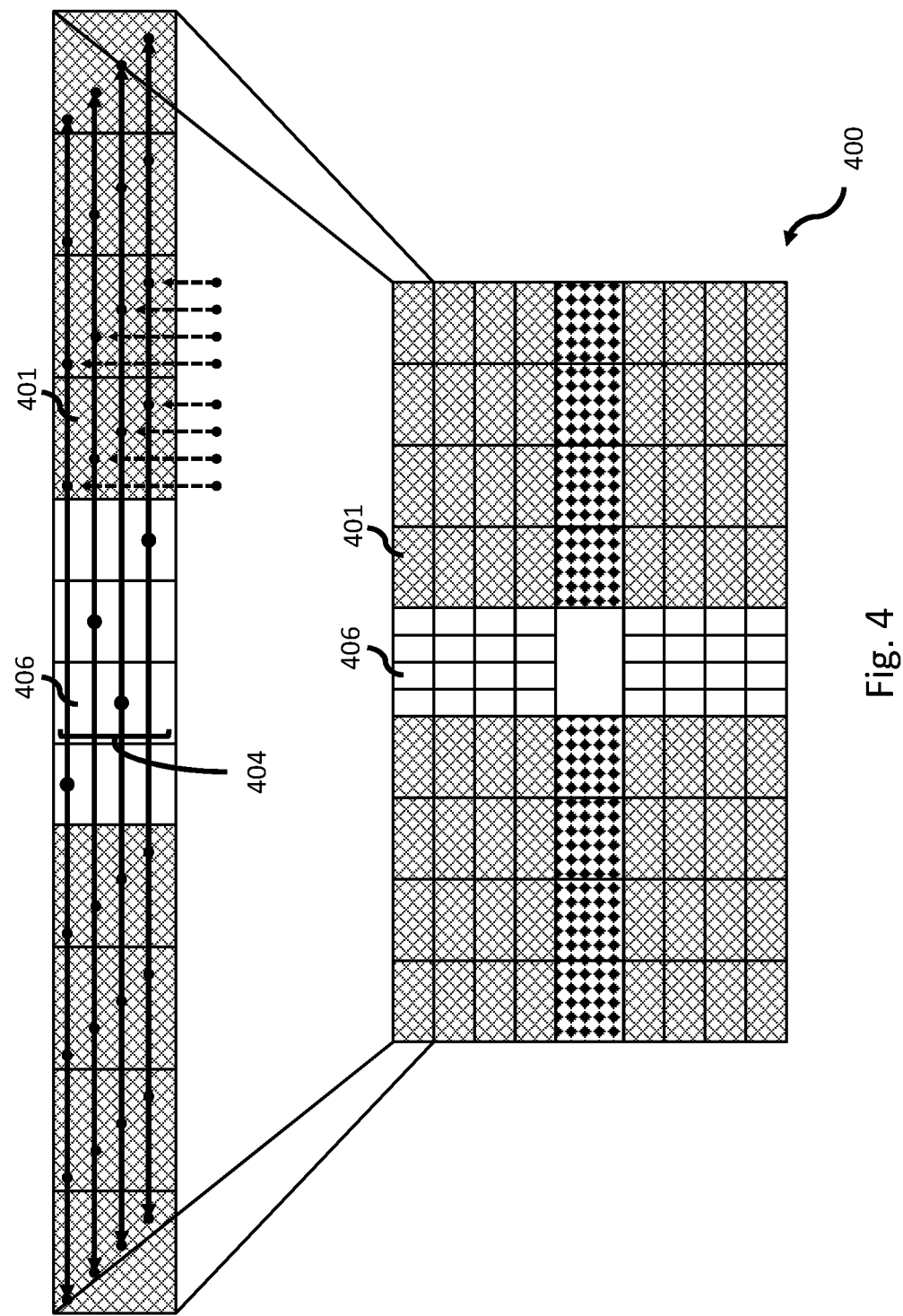
FIG. 4 shows a further exemplary crossbar switch arrangement, in accordance with one or more aspects of the present invention.

FIG. 4 shows a second exemplary crossbar switch arrangement 400, which differs from the first exemplary crossbar switch arrangement shown in FIG. 1 in that the input drivers 406 for driving the input lines 404 are located in an inner area of the crossbar switch arrangement 400 and the multiplexers 401 are located at an outer area of the crossbar switch arrangement 400. Hence, the length of the input lines 404 from the input drivers 406 to the respective farthest multiplexer 401 is reduced. This may result in a decreased wire delay of the input lines 404 and reduce the risk of timing problems.

Figure 5:
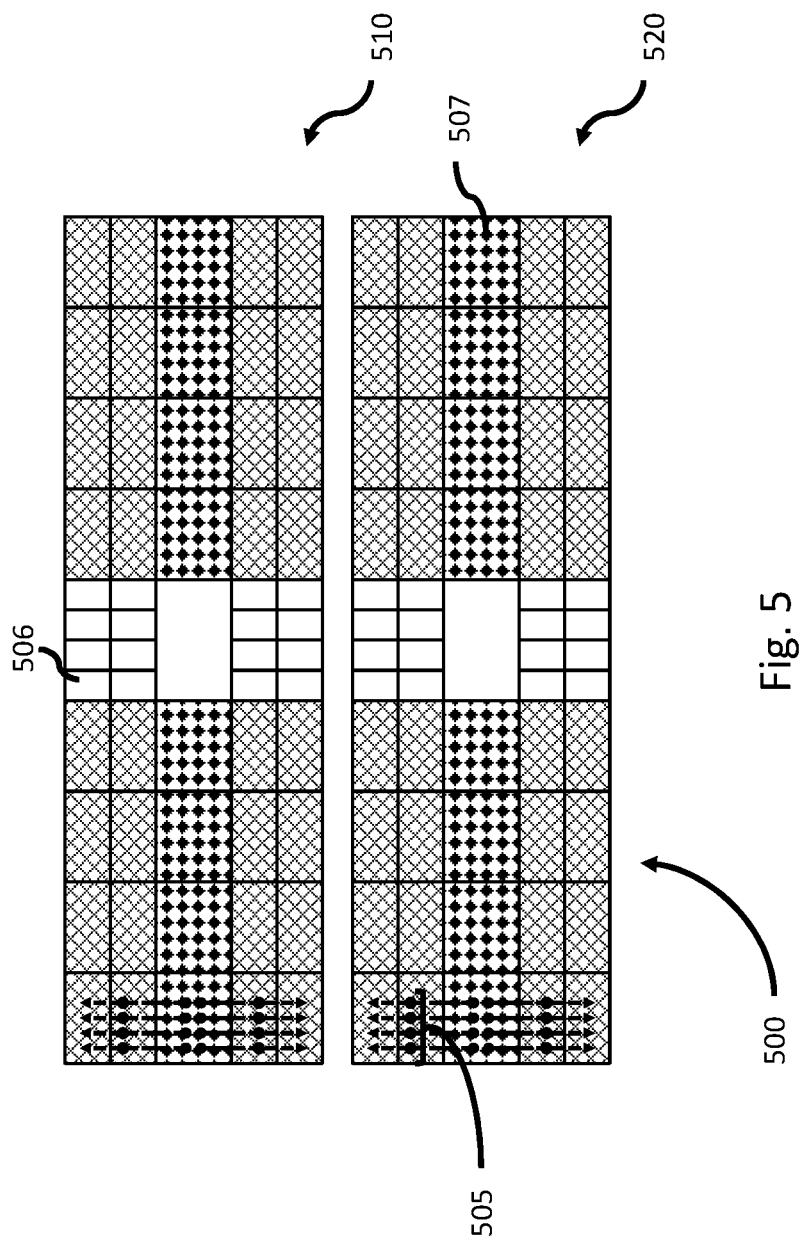
FIG. 5 shows another exemplary crossbar switch arrangement, in accordance with one or more aspects of the present invention.

FIG. 5 illustrates a third exemplary crossbar switch arrangement 500. The crossbar switch arrangement 500 differs from the crossbar switch arrangements 100 and 400 shown in FIGS. 1 and 4 in that the number of multiplexers addressed by each of the select lines 505 is reduced. Thus, wire delay of the select lines 505 and the risk of associated timing problems may be reduced. In the example shown in FIG. 5, the crossbar switch arrangement 500 is divided in two sub crossbar switch arrangements 510 and 520. The crossbar switch arrangement 500 may also be divided in more than two sub crossbar switch arrangements. Due to the division, the number of select drivers is increased. According to the exemplary crossbar switch arrangement 500, the data drivers 506 are provided centrally. However, it is also possible to image a crossbar switch arrangement with sub crossbar switch arrangements, wherein the data drivers are provided at the edges like in the example shown in FIG. 1.

Figure 6:
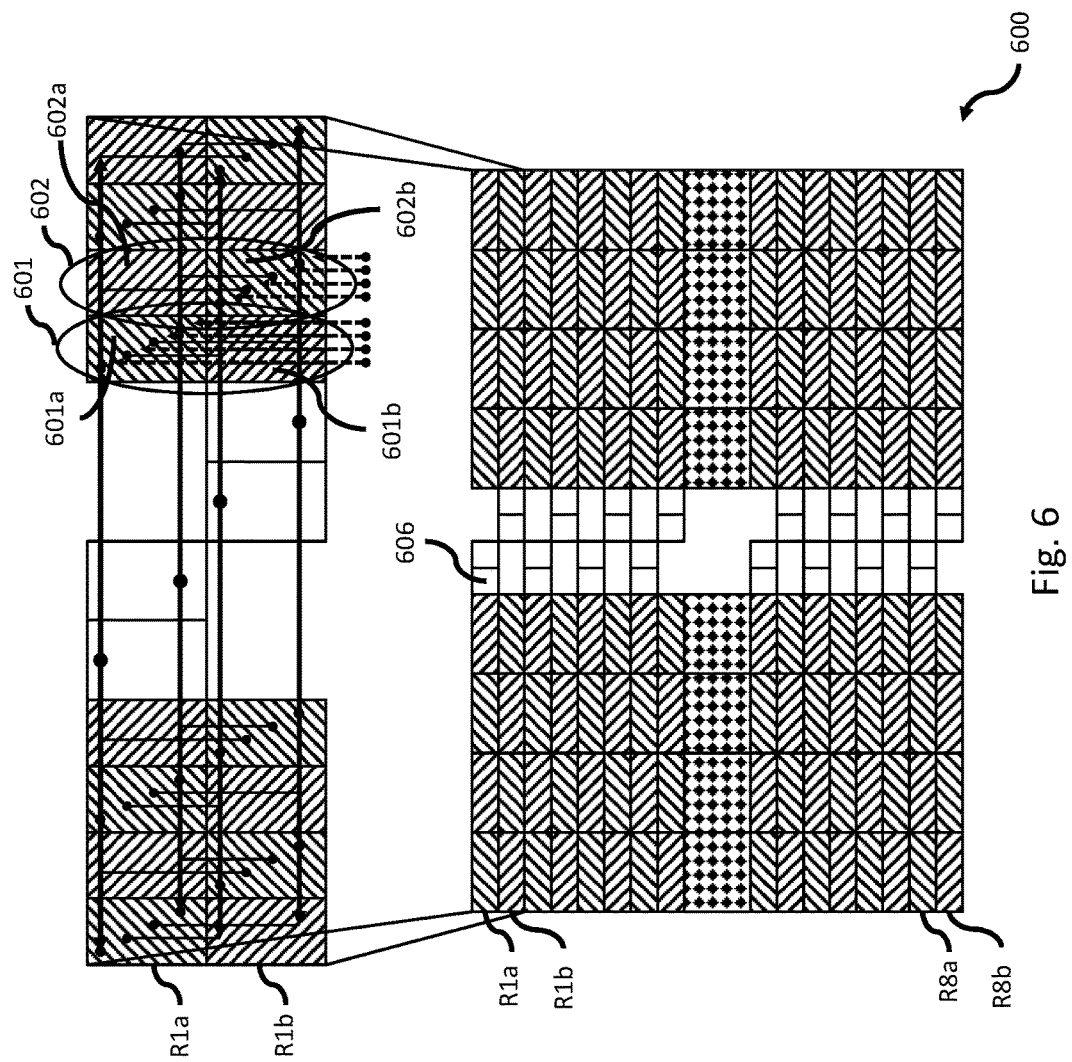
FIG. 6 shows another exemplary crossbar switch arrangement, in accordance with one or more aspects of the present invention.

FIG. 6 shows a fourth exemplary crossbar switch arrangement 600. The crossbar switch arrangement 600 includes eight times two adjacent bit bay areas R1a, R1b, . . . , R8a, R8b, wherein each bit bay area includes two power supply rails. The multiplexer 601 includes two multiplexer areas 601a and 601b, which are located in the adjacent bit bay areas R1a and R1b. The multiplexer area 601a includes a multiplexing circuit (hatched pattern from lower left to upper right) having a number of data inputs and a number of select inputs and the multiplexer area 601b includes a primary output driver (hatched pattern from upper left to lower right).

The multiplexer 602 next to the multiplexer 601 also includes two multiplexer areas 602a and 602b, which are located in the adjacent bit bay areas R1a and R1b. However, the multiplexer area 602a includes the primary output driver (hatched pattern from upper left to lower right) and the multiplexer area 602b includes the multiplexing circuit (hatched pattern from lower left to upper right). Thus, the multiplexer areas including the multiplexing circuits of neighboring multiplexers are located space apart from each other. This arrangement may also be called interleaving. It may result in a checkerboard pattern. Using multiplexers having two multiplexer areas in adjacent bit bay areas may allow for a reduced data line density and, accordingly, larger data lines. In case, multiplexing circuits of adjacent multiplexer are space apart from each other, the distance between adjacent signal lines and the physical width of the crossbar switch arrangement may be reduced. In addition, such an arrangement may allow for shorter input lines reducing the risk of timing problems when inputting data into the data inputs of the multiplexers.

FIGS. 7a, 7b and 7c illustrate the advantages in terms of input line length of placing the data drivers in the center of the multiplexers (FIG. 7b) and interleaving the multiplexing circuits with the primary output drivers (FIG. 7c) compared to a standard arrangement (FIG. 7a), which facilitates wiring of the select drivers. Accordingly, the eight select lines may have double the amount of space available compared to a non-interleaved design, where they would have to share half the space over the stacked multiplexing circuits.

Figure 8:
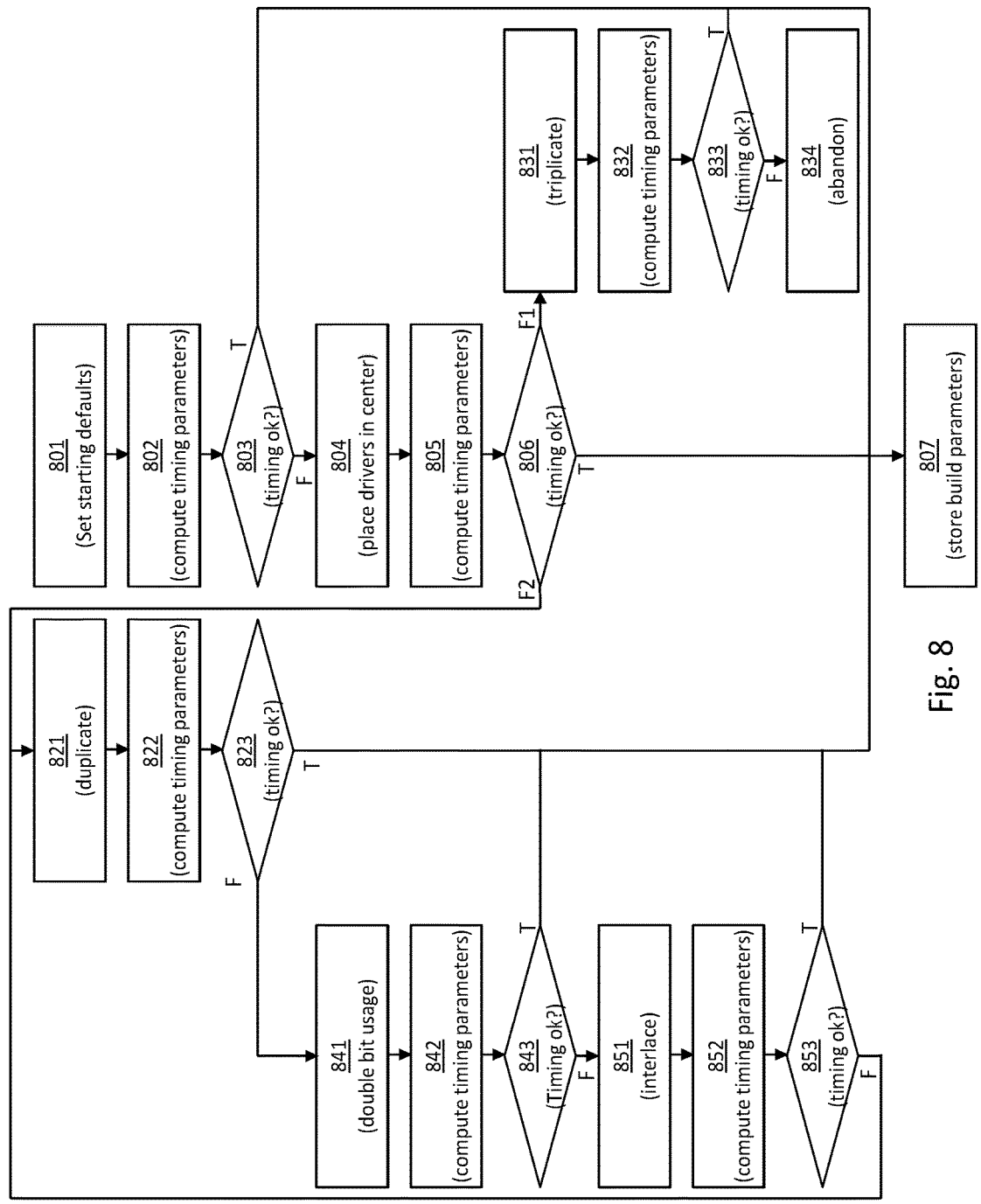
FIG. 8 shows a method for generating design data for a crossbar switch arrangement, in accordance with one or more aspects of the present invention.

FIG. 8 illustrates a method for automatically generating design data for a semiconductor circuit including a cross bar switch. The specification of the semiconductor may be described in VHDL (VHSIC Hardware Description Language, Very High Speed Integrated Circuit Hardware Description Language).

In a first step 801, a crossbar switch is synthesized using predefined building blocks, wherein the predefined building blocks include at least a multiplexer, an input driver and a select driver as shown in FIG. 1, for example.

Using placement defaults, the selected predefined building blocks are placed and the resulting timing parameters are calculated (step 802).

Thereafter, it is determined whether the timing constraints for the input lines and the select lines are met (step 803). If this is the case, the selected building blocks and their placement are stored as build parameters for the semiconductor circuit (807).

If the timing constraints are not met, the placement instructions for the selected predefined building blocks are modified in step 804 such that the input drivers are placed in the center of the multiplexers as shown for example in FIG. 4.

Using these amended placement instructions, the selected predefined building blocks are replaced and the resulting timing parameters are calculated again (step 805).

If it is determined in step 806, that the timing constraints are still not met, the method may continue with step 832 or 831.

In step 831, the originally selected multiplexers are each substituted with three multiplexers (triplicated) having a third of the original multiplexer depth, which are combined with an OR-circuit as shown in the lower part of FIG. 2.

Thereafter, placing and timing parameter calculation with the newly selected multiplexers is performed (step 832). In case the timing parameters comply with the timing constraints then, the selected building-blocks and placement parameters are stored as build parameters for the semiconductor circuit (step 807).

In step 821, the originally selected multiplexers are each substituted with two multiplexers (duplicated) having half of the multiplexer depth before. Again the timing parameters are calculated (step 822) and compared to the timing constraints (step 823). If the latter are met, the selected building-blocks and placement parameters are stored as build parameters for the semiconductor circuit (step 807).

If not, the multiplexers are modified to include multiple multiplexer areas extending over at least two bit bay areas (step 841), the timing parameters are computed (step 842). In case a comparison with the timing constraints (step 843) reveals that the design still does not comply with the requirements, the multiplexers are placed such that multiplexer area including the multiplexing circuit of neighboring multiplexer are located spaced apart from each other as shown in the example of the FIG. 6.

If, after calculation of the timing parameters (step 852), the timing parameters comply with the timing constraints (step 853) the selected building blocks and placement parameters are stored as build parameters for the semiconductor circuit (step 807).

Otherwise, the number of multiplexers is another time duplicated (step 821) and the steps 822 and 823 (and possibly steps 841, 842, 843, 851, 852, 853) are repeated.

The two paths with the duplicated or triplicated number of multiplexers starting with steps 832 and 831, respectively, may be run in parallel. If one of the two paths leads to compliance with the timing constraints, the other path may be abandoned. In another embodiment, the path with the triplicated number of multiplexers may be run only, if the path with the duplicated number of multiplexers did not lead to compliance with the timing constraints.

Figure 9:
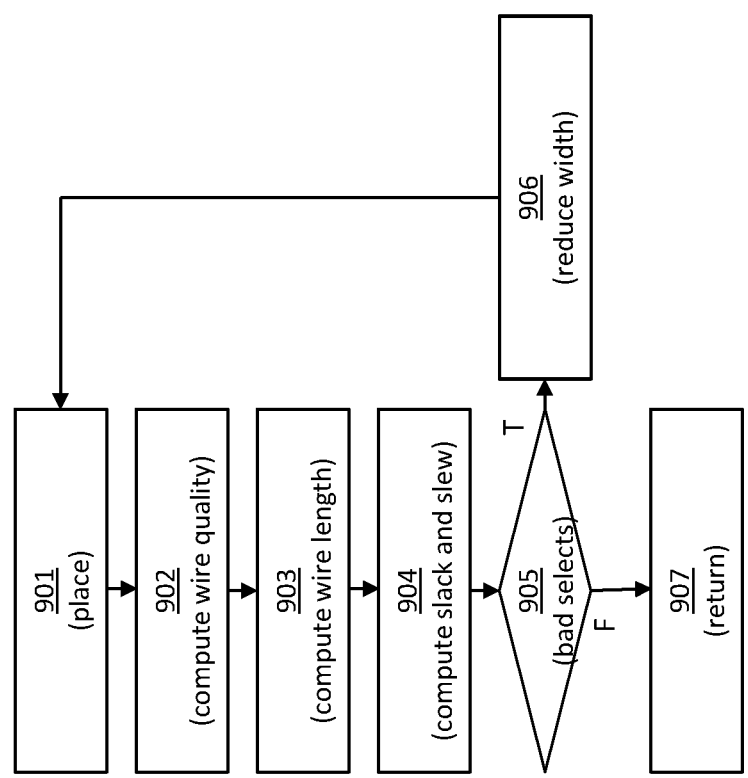
FIG. 9 illustrates one or more steps of the method of FIG. 8, in accordance with one or more aspects of the present invention.

FIG. 9 illustrates an exemplary calculation of the timing parameters as performed in steps 802, 805, 822, 842, 852, 832, shown in FIG. 8. In a first step 901, the selected building blocks are placed. Thereafter, the maximal available wire quality for the input lines is determined (step 902). Further, the wire length for the input lines and the select lines is calculated (step 903). Based on the wire quality and the wire length, the slack and the slew for the multiplexer data and select inputs are calculated (step 904).

In step 905 it is determined if the slack of the worst select line is worse than the slack of the worst input line or if the slew of the select line is above a predetermined threshold.

If this is the case, the amount of multiplexers addressed by one select line (and accordingly, one select driver) is reduced (step 906) and steps 901 to 905 are repeated. Otherwise the calculation of the timing parameters ends (step 907).

Figure 10:
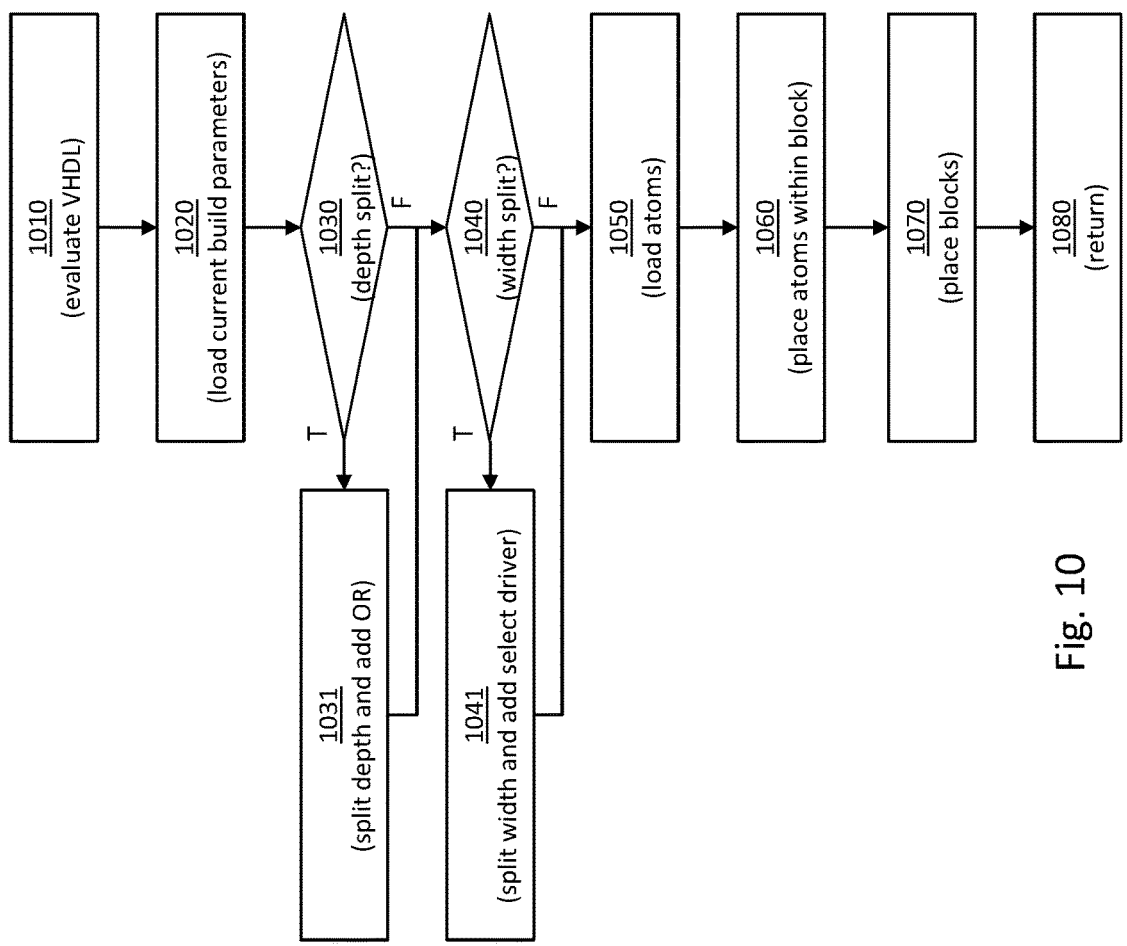
FIG. 10 illustrates one or more steps of the method of FIG. 9, in accordance with one or more aspects of the present invention.

FIG. 10 shows a possible method for implementing step 901 of FIG. 9. The method starts with determining the requirements of the crossbar switch, namely, the number of outputs of the crossbar switch which corresponds to the number of the multiplexers to be used, the depth of the crossbar switch arrangement corresponding to the number of inputs of the crossbar switch arrangement and the width of the crossbar switch arrangement corresponding to the number of multiplexers to be addressed per select line (step 1010). Based on the number of outputs, the crossbar switch width and the crossbar switch depth, the width and depth of the multiplexers to be used may be pre-selected.

In a second step 1020, the current build parameters are determined. The current build parameters may determine if the multiplexers are to be split, e.g., duplicated or triplicated as has been described hereinbefore with respect to FIGS. 2 and 3, if the crossbar switch is to be split in the width direction as has been described herein with respect to FIG. 5, if the input drivers are to be placed in the center as has been described hereinbefore with reference to FIG. 4, if the multiplexers are to be provided with multiplexer areas in adjacent bit bay areas, and in the latter case if the multiplexer areas are to be interleaved as has been described hereinbefore with reference to FIG. 6.

As default, it may be prescribed that blocks of 32 multiplexers are provided in the width direction, i.e. per select line, that the multiplexers are not split in depth, that the input driver are provided at the edges of the multiplexer blocks, that the multiplexers do not cover adjacent bit bay areas, and that no interleaving takes place.

In a further step 1030, it is analyzed whether the build parameters prescribe splitting the depth of the multiplexers. If this is the case, the multiplexer is split and an OR-stage is added (step 1031).

If not and after step 1031, it is analyzed whether the build parameters prescribe splitting the width of the multiplexers (step 1040). This being the case, the width of the multiplexers is reduced and the select drivers and associated circuits are duplicated (step 1041).

If not and after step 1041, placement atoms are loaded from a library. Placement atoms may refer to manually optimized small structures which are used in larger numbers. For example, the individual multiplexers forming the multiplexer blocks of the crossbar switch may be provided as placement atoms (steps 1050). In particular, the library may include placement atoms for multiplexers having two data inputs (MUX2), four data inputs (MUX4), six data inputs (MUX6), eight data inputs (MUX8), the respective multiplexers with an included OR-circuit (MUX+OR2, MUX+OR4, MUX+OR6, MUX+OR8), input drivers banks, select driver banks, power output drivers, etc.

In the next step 1060, the atoms are placed to form blocks according to the build plan respecting the split results, the input driver position, the number of multiplexers atoms in a row/column and the possibly prescribed interleaving.

Further, in step 1070, the blocks are placed to reach the full width and depth of the crossbar switch arrangement. For example, the blocks generated in step 1060 may have a width of 32, 16 or less bits and the whole crossbar switch arrangement may have a width of 64, 128 or more bits. Thus, several blocks may have to be combined to reach the full width and depth of the crossbar switch arrangement.

Having placed the atoms and blocks it is returned to the method as described in FIG. 9 (step 1080).

Those skilled in the art will note from the above description that provided herein, in one or more aspects, is a method for automatically generating design data for a semiconductor circuit including a crossbar switch. The method includes synthesizing the crossbar switch using predefined multiplexer building blocks, wherein the predefined multiplexer building blocks comprise at least a multiplexer, an input driver and a select driver; regularly placing the predefined multiplexer building blocks to define a crossbar switch arrangement; testing the crossbar switch arrangement for timing constraints;—re-synthesizing the crossbar switch and/or replacing of the predefined multiplexer building blocks based on the testing.

In one embodiment, the method includes repeating testing and re-synthesizing and/or replacing.

A further embodiment of the method for automatically generating design data for a semiconductor circuit including a crossbar switch prescribes that re-synthesizing of the crossbar switch includes splitting the depth of the multiplexers.

Additionally, an embodiment of the method for automatically generating design data for a semiconductor circuit prescribes that replacing includes placing an input driver in the center of the cross bar switch arrangement.

In another embodiment of the method for automatically generating design data for a semiconductor circuit including a crossbar switch splitting the multiplexer depth includes dividing the multiplexer depth by three.

According to a further embodiment of the method for automatically generating design data for a semiconductor circuit splitting the multiplexer depth includes dividing the multiplexer depth by two.

In another embodiment of the method for automatically generating design data for a semiconductor circuit including a crossbar switch re-synthesizing includes using multiplexers including multiple multiplexer areas, such as two multiplexer areas, wherein one of the multiplexer areas includes a primary output driver and the remaining multiplexer areas include the multiplexing circuits, wherein replacing includes placing the multiplexer such that the multiplexer area are located in adjacent bit bay areas, wherein a single bit bay area includes two power supply rails. This may result in so-called "interleaved multiplexers". Interleaving the multiplexers may reduce the space required for building the crossbar switch arrangement along the direction of the data wires, i.e. in the horizontal direction.

According to a further embodiment of the method for automatically generating design data for a semiconductor circuit replacing comprises placing the multiplexers such that the multiplexer areas including the multiplexing circuit of neighboring multiplexers are located spaced apart from each other.

Additionally, an embodiment of the method for automatically generating design data for a semiconductor circuit prescribes that re-synthesizing includes using additional select drivers and replacing includes connecting fewer multiplexers to each select driver.

In an embodiment, a computer program product is provided, the computer program product being programmed for executing a method described herein when executed on a programmable computer. The computer program product may include a storage medium for storing the program, such as semiconductor storage (Flash, RAM, etc.) or magnetic or optical mass storage devices (optical discs, hard discs, etc.).

In one or more other embodiments, a system is provided herein for automatically generating design data for a semiconductor circuit including a crossbar switch. The system includes a memory, and a processor communicatively coupled to the memory, where the system performs a method including synthesizing the crossbar switch using predefined multiplexer building blocks, where the predefined multiplexer building blocks include at least a multiplexer, an input driver and a select driver. Further, the method includes regularly placing the predefined multiplexer building blocks to define a crossbar switch arrangement, testing the crossbar switch arrangement for timing constraints, and resynthesizing the crossbar switch and/or replacing the predefined multiplexer building blocks based on the testing.

An exemplary embodiment of a computing environment which may implement one or more aspects of the present invention is described below with reference to FIG. 11.

Figure 11:
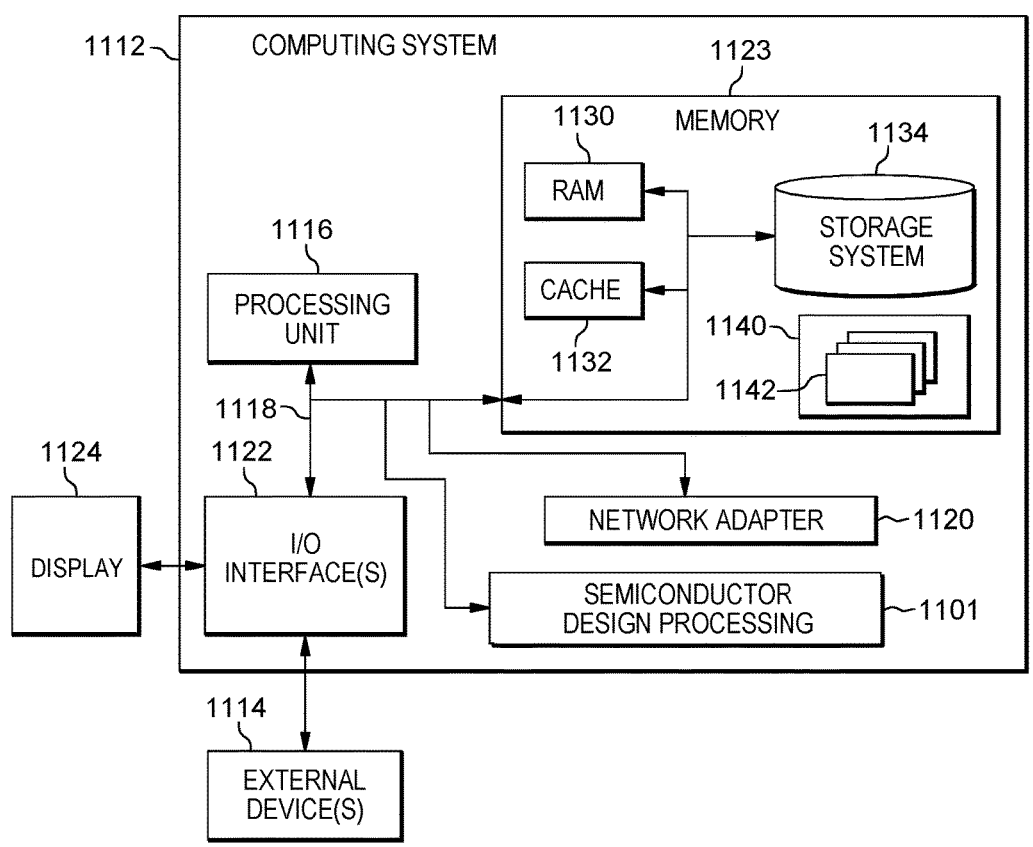
FIG. 11 depicts one embodiment of a computing system which may implement or facilitate implementing automated design processing, in accordance with one or more aspects of the present invention.

By way of example, FIG. 11 depicts one embodiment of a computing environment 1100, which includes a computing system 1112. Examples of well-known computing systems, environments, and/or configurations that may be suitable for use with computer system 1112 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1112 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 11, computing system 1112, is shown in the form of a general-purpose computing device. The components of computing system 1112 may include, but are not limited to, one or more processors or processing units 1116, a system memory 1123, and a bus 1118 that couples various system components including system memory 1123 to processor 1116.

In one embodiment, processor 1116 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1112 may include a variety of computer system readable media. Such media may be any available media that is accessible by computing system

1112, and it includes both volatile and non-volatile media, removable and non-removable media.

System memory 1123 can include computer system readable media in the form of volatile memory, such as random access memory (RAM) 1130 and/or cache memory 1132. Computing system 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1118 by one or more data media interfaces. As described below, memory 1123 may include at least one program product having a set (e.g., at least one) of program modules that are configured to carry out the functions of embodiments of the invention.

Program/utility 1140, having a set (at least one) of program modules 1142, may be stored in memory 1132 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein. Alternatively, a semiconductor design processing module, logic, etc., 1101 may be provided within computing environment 1112.

Computing system 1112 may also communicate with one or more external devices 1114 such as a keyboard, a pointing device, a display 1124, etc.; one or more devices that enable a user to interact with computing system 1112; and/or any devices (e.g., network card, modem, etc.) that enable computing system 1112 to communicate with one or more other computing devices. Such communication can occur via Input/Output (I/O) interfaces 1122. Still yet, computing system 1112 can communicate with one or more networks such as a local area network (LAN), a general wide area network (WAN), and/or a public network (e.g., the Internet) via network adapter 1120. As depicted, network adapter 1120 communicates with the other components of computing system, 1112, via bus 1118. It should be understood that although not shown, other hardware and/or software components could be used in conjunction with computing system 1112. Examples, include, but are not limited to: microcode, device drivers, redundant processing units, external disk drive arrays, RAID systems, tape drives, and data archival storage systems, etc.

The methods may be implemented using a computer program product. The computer program product may include a computer readable storage medium (or media) having computer readable program instructions thereon for causing a processor to carry out aspects of the method.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

Aspects are described herein with reference to flowchart illustrations and/or block diagrams of methods. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    automatically generating design data for a semiconductor circuit comprising a crossbar switch, the automatically generating comprising:
        synthesizing the crossbar switch using predefined multiplexer building blocks, wherein the predefined multiplexer building blocks comprise at least a multiplexer, an input driver and a select driver;
        regularly placing the predefined multiplexer building blocks to define a crossbar switch arrangement;
        testing the crossbar switch arrangement for timing constraints;
        re-synthesizing the crossbar switch or replacing of the predefined multiplexer building blocks based on the testing;
    wherein:
        the re-synthesizing comprises using multiplexers comprising multiple multiplexer areas;
        one of said multiplexer areas comprise a primary output driver and the remaining multiplexer areas include the multiplexing circuits;
        the replacing comprises placing the multiplexer such that the multiplexer area are located in adjacent bit bay areas, wherein a single bit bay area includes two power supply rails; and
    initiating fabrication of the semiconductor circuit comprising the crossbar switch using the automatically generated design data.

2. The method according to claim 1, wherein the method comprises repeating the testing and the re-synthesizing or replacing with amended synthesizing or placing parameters.

3. The method according to claim 1, wherein replacing comprises placing an input driver in the center of two multiplexers.

4. The method of claim 1, wherein the replacing comprises placing the multiplexers such that the multiplexer areas including the multiplexing circuit of neighboring multiplexers are located spaced apart from each other.

5. The method of claim 1, wherein re-synthesizing comprises using additional select drivers and replacing comprises connecting fewer multiplexers to each select driver.

6. A computer program product comprising:
    a computer readable storage medium having computer readable program code embodied therewith, the computer readable program code being executable by a processor to perform a method comprising:
        automatically generating design data for a semiconducting circuit comprising a crossbar switch, the automatically generating comprising:
            synthesizing the crossbar switch using predefined multiplexer building blocks, wherein the predefined multiplexer building blocks comprise at least a multiplexer, an input driver and a select driver;
            regularly placing the predefined multiplexer building blocks to define a crossbar switch arrangement;
            testing the crossbar switch arrangement for timing constraints;
            re-synthesizing the crossbar switch or replacing of the predefined multiplexer building blocks based on the testing;
        wherein:
            the re-synthesizing comprises using multiplexers comprising multiple multiplexer areas;
            one of said multiplexer areas comprise a primary output driver and the remaining multiplexer areas include the multiplexing circuits; and
            the replacing comprises placing the multiplexer such that the multiplexer area are located in adjacent bit bay areas, wherein a single bit bay area includes two power supply rails;
        initiating fabrication of the semiconductor circuit comprising the crossbar switch using the automatically generated design data.

7. The computer program product of claim 6, wherein the method comprises repeating the testing and the re-synthesizing or replacing with amended synthesizing or placing parameters.

8. The computer program product of claim 6, wherein replacing comprises placing an input driver in the center of two multiplexers.

9. The computer program product of claim 6, wherein the replacing comprises placing the multiplexers such that the multiplexer areas including the multiplexing circuit of neighboring multiplexers are located spaced apart from each other.

10. The computer program product of claim 6, wherein re-synthesizing comprises using additional select drivers and replacing comprises connecting fewer multiplexers to each select driver.

11. A system comprising:
    a memory; and a processor communicatively coupled to the memory, wherein the system performs a method comprising:

automatically generating design data for a semiconducting circuit comprising a crossbar switch, the automatically generating comprising:

synthesizing the crossbar switch using predefined multiplexer building blocks, wherein the predefined multiplexer building blocks comprise at least a multiplexer, an input driver and a select driver;

regularly placing the predefined multiplexer building blocks to define a crossbar switch arrangement;

testing the crossbar switch arrangement for timing constraints;

re-synthesizing the crossbar switch or replacing of the predefined multiplexer building blocks based on the testing;

wherein:

the re-synthesizing comprises using multiplexers comprising multiple multiplexer areas;

one of said multiplexer areas comprise a primary output driver and the remaining multiplexer areas include the multiplexing circuits;

the replacing comprises placing the multiplexer such that the multiplexer area are located in adjacent bit bay areas, wherein a single bit bay area includes two power supply rails; and initiating fabrication of the semiconductor circuit comprising the crossbar switch using the automatically generated design data.

* * * * *